April 15, 1941.　　　　E. B. SAWTELLE　　　　2,238,190
INSTRUMENT FOR COURSE AND POSITION PLOTTING
Filed Aug. 2, 1939　　　2 Sheets-Sheet 1
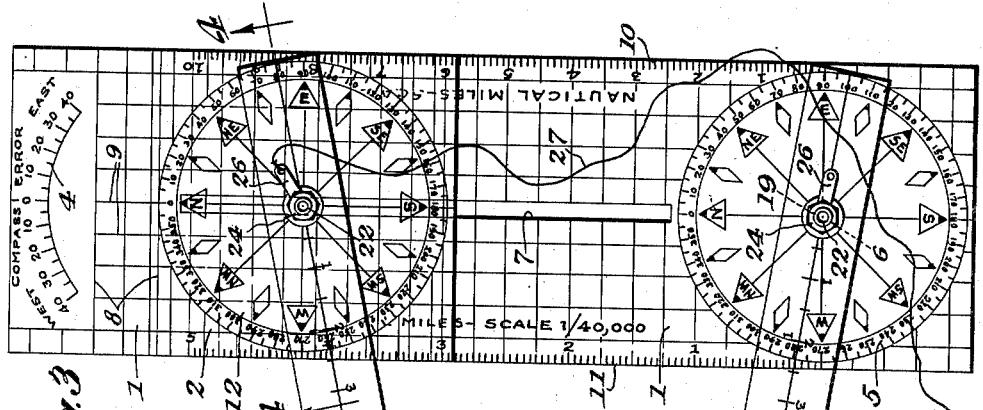
INVENTOR.
Egerton B. Sawtelle
BY Spear, Rawlings & Spear
ATTORNEYS April 15, 1941.  E. B. SAWTELLE  2,238,190
INSTRUMENT FOR COURSE AND POSITION PLOTTING
Filed Aug. 2, 1939   2 Sheets-Sheet 2

INVENTOR.
Egerton B. Sawtelle
BY Spear, Rawlings & Spear
ATTORNEYS.

Patented Apr. 15, 1941

2,238,190

UNITED STATES PATENT OFFICE 2,238,190

INSTRUMENT FOR COURSE AND POSITION PLOTTING

Egerton B. Sawtelle, Cape Elizabeth, Maine

Application August 2, 1939, Serial No. 287,950

13 Claims. (Cl. 33—98)

My present invention relates to novel navigation instruments particularly adapted for use in connection with charts to plot courses or positions.

In navigation, the use of charts is necessary and many instruments have been devised to facilitate the use of such charts in plotting courses and positions. The type of instruments with which I am concerned are those employing one or more protractors with each of the protractors being adapted to carry from one to three arms.

Such instruments are used in plotting courses by placing a protractor over a point on the chart representing the start of the course and placing an arm in alined position with the end of the course. If the protractor is positioned properly, the course is accurately given.

In plotting positions, the problem is somewhat similar, although it involves establishing at least two intersecting lines along each of which the ship is known to be so that its true position must be at the point of intersection of the established lines. While the intersecting lines may be established in several different ways, some of which I discuss after a description of my invention, the proper orientation of the instrument on the chart is always of controlling importance.

In considering my invention it should be kept in mind that bearings, employed both in course and position plotting, represent the direction of an object from the ship. Such bearings are true bearings when they relate to the geographical pole. They are magnetic bearings when they relate to the magnetic pole and they are compass bearings when they relate to the readings of a particular compass. Bearings may also be relative when they relate only to the fore and aft line of the ship.

In using compass bearings it is essential to the proper plotting of a position or a course on a chart that the instrument be accurately positioned on the chart and be adapted to permit a compass bearing to be corrected to a magnetic bearing or a true bearing. With relative bearings the same problem exists but has already been made in determining the course. With all bearings, therefore, it is an essential that the instrument be adapted to be brought accurately into a position parallel with a line that may represent true north, magnetic north or an established course.

In accordance with my invention, I provide a navigation instrument that is adapted to be used in connection with any of the above mentioned bearings and is adapted to be used in establishing the intersecting lines necessary for position plotting in several different ways. This adaptability of my invention is one of its important features since it permits several different instruments to be combined in one as well as permitting certain novel uses not possible prior to my invention.

My invention consists of a novel base having a fixed protractor and is adapted to slidably receive a second or movable protractor. Each of the protractors may carry from one to three arms and a hollow nut and bolt assembly permits the arms and the movable protractor to be attached or removed from the base quickly and easily.

While each protractor may be used by itself, the advantages of my invention are fully realized when either one or both of them are used in connection with the base. For example, the base piece carries an arcuate graduation concentric with one end of a slot in the base through which the movable protractor is attached by the hollow bolt and nut assembly. This graduation is the compass error scale and when the movable protractor is in an extreme position adjacent the compass error scale, the movable protractor and the compass error scale are concentric so that a cardinal point of the movable protractor may be adjusted with reference to the compass error scale, so that magnetic variation, the angle between true and magnetic north for the particular locality, and compass deviation, the angle between magnetic north and the north of the compass on a particular heading, may be corrected in the positioning of the movable protractor with reference to the base.

The base piece is further adapted to facilitate all measurements when it is used. This results from longitudinal and transverse lines that establish squares. The transverse lines are readable with reference to different marginal scales which aid in its proper positioning on a chart and are part of marginal graduations establishing two different scales. The longitudinal lines are similarly of assistance in accurately placing the instrument on the chart and one of the longitudinal lines is a center line inclusive of the "zero" reading on the compass error scale.

Other details of my invention are also important. Among these may be noted the hollow nut and bolt assembly that permits the accurate centering of a protractor over a point on a chart or the making of such a point and the lug by which the tightening or loosening of the nut is facilitated. Other features not specifically discussed here but which contribute to the simplicity and adaptability of my invention to accurate chart work will be noted either in connection with the description of my invention or in the description of its use in connection with certain typically illustrative problems.

In the drawings I have illustrated a preferred embodiment of my invention from which its several novel features and advantages will be readily apparent. In the drawings:

Fig. 1 is a plan view of the base.

Fig. 2 is a plan view of the movable protractor.

Fig. 3 is a view of an instrument in accordance with my invention for use in bearing-distance-bearing position plotting.

Fig. 4 is an enlarged sectional view along the lines 4—4, of Fig. 3, showing the nut and bolt assembly.

Figure 6:
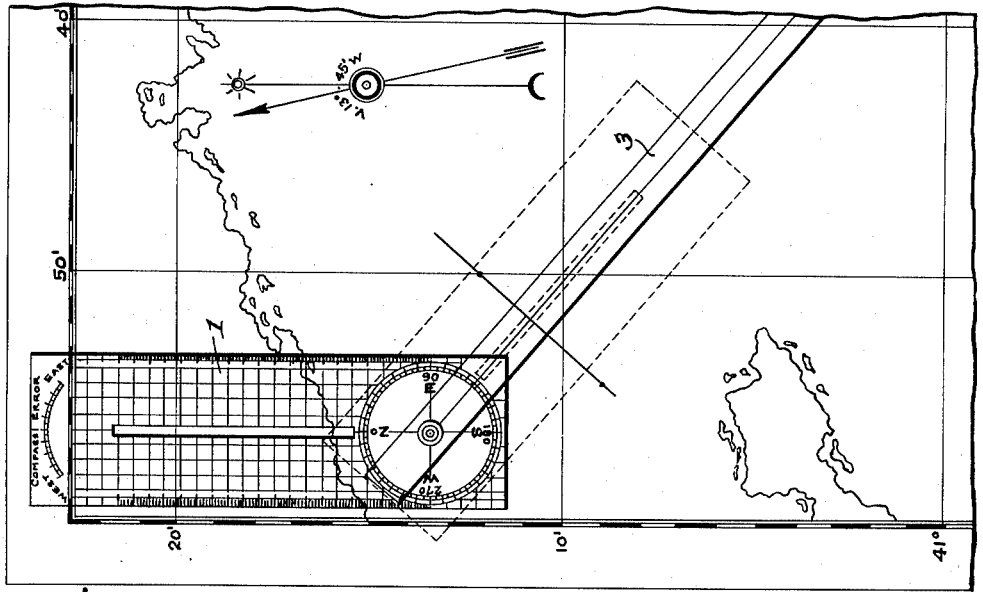
Fig. 6 is a similar view illustrating other typical uses of my invention.

In accordance with my invention I employ a base piece 1, a protractor member 2 and arms 3, all of which are made of a suitable transparent material that may be accurately cut and marked. Preferably such material is laminated so that graduations, lettering and the like may be protected.

The base piece 1 is preferably rectangular in form and is formed with arcuate graduations 4 adjacent one end. The graduations 4 are indicative of degrees of compass error by which I mean the magnetic variation locally determined as the angle between true and magnetic North to which must be added or subtracted compass deviations by which is meant the angle between compass North and magnetic North. In contrast to magnetic variations which are set forth on charts, compass deviation is peculiar to each particular compass and varies with each heading of the ship. It will therefore be appreciated that compass error is a very important factor in navigation and one of the important features of my invention is that it may be mechanically corrected in position or course plotting when necessary. In certain methods of position plotting, as where relative bearings are employed, compass error does not need to be taken into consideration on the plotter.

Adjacent the other end of the base piece 1, I provide graduations 5 preferably in the form of a compass rose which will hereafter be referred to as the fixed protractor. The base 1 is formed with an aperture 6 in the center of the fixed protractor 5.

At 7 I provide a slot in alinement with the zero marking of the compass error scale 4 and the center 6 of the fixed protractor 5 which is the center line of the base 1.

The entire base 1 is formed with transverse lines 8 and longitudinal lines 9 establishing a plurality of squares. The transverse lines 8 are readable with reference to marginal scales 10 and 11. The scales 10 and 11 are preferably different. For example, the scale 10 may be 1 to 80,000, while the scale 11 may be 1 to 40,000, these two scales being the two conventional chart scales in terms of nautical miles. Each graduation of the scale 10 preferably is in transverse alinement with a corresponding graduation of the scale 11. This requires that the scale 11 be in twentieths and that the scale 10 be in tenths.

The size of the base 1 is of importance. While its size is limited to that which is convenient in use, in accordance with my invention it must be of a size so that however disposed on the chart a meridian or a parallel latitude will be covered so that the instrument may be accurately oriented in relation thereto by the use of the lines 8 and 9 and the marginal scales 10 and 11.

The protractor member 2, hereinafter referred to as the movable protractor, is formed with graduations 12 preferably in the form of a compass rose in the center of which I provide an aperture 13. Exteriorly of the compass rose 12, the protractor member is formed with longitudinal lines 14, one of which establishes a center line, and transverse lines 15 establishing squares identical in size to the squares on the base 1 so that the movable protractor 2 may be accurately alined with the base. Preferably the lines and graduations of the member 2 are of a color in contrast with the lines and graduations of the base 1.

As the arms 3 are preferably all identical, a description of one of the arms will suffice. The arms 3 are formed to present a center line 16 suitably marked to establish scales 17 and 18 identical with the scales 10 and 11, respectively. Adjacent one end of the arms 3 I provide an aperture 19 similar in size to the apertures 6 and 13. Preferably the apertures 19 are so disposed that the rear of the arms 3 are readable with reference to the compass rose of the protractors 5 and 12. Each of the arms 3 is formed with preferably two apertures 20 through the center line 16. One of the apertures 20 is adjacent the end of the arm 3 opposite to the aperture 19. The apertures 20 are adapted to receive pins or the like to establish sights for use in taking bearings or to receive tacks or the like as will subsequently be more fully explained in connection with the use of instruments in accordance with my invention in plotting Sumner lines.

To assemble my instrument I have provided means which may be most clearly seen in Fig. 4. The assembly means include a hollow bolt 22, transparent washers 23, nut 24, and a centering lug 25 having an apertured handle 26 to which may be attached a string or cord 27 to establish a typical string course protractor. The lug 25 may be employed in loosening and tightening the nut 24. It should be here noted that the bolt 22 is of sufficient length to permit at least three arms 3 to be assembled on either one of the protractors 5 and 12 to establish a three arm protractor. While other assembly means may be employed, the assembly just described is attended by several advantages.

The instrument thus described in reality includes several different instruments since the use of several arms in certain uses would be inconvenient. Thus, the movable protractor 2 may be used with a string 27 to establish a string course protractor, with an arm 3 to establish an arm course protractor, and with the protractor 2 with one arm 3 attached and itself slidably attached to the base 1, to establish a course protractor allowing mechanically for compass error.

The instrument above described establishes several instruments for use in position plotting. With the movable protractor 2 with two arms 3 attached for plotting a position from observed relative bearings, it establishes a cross bearing position plotter and with the movable protractor 2 with two arms 3 attached and itself slidably attached to the slotted base 1, it establishes a cross bearing position plotter that allows for course and compass error mechanically. The movable protractor 2 may also be used with three of the arms 3 attached for plotting a position accurately, regardless of compass error with any three bearings of the same type. With the movable protractor 2 attached to the base 1 and each of the protractors 3 and 5 carrying an arm 3, a bearing-distance-bearing position plotter is established, and with the base 1 and a single arm 3 attached to its fixed protractor 5, an instrument is provided for use in plotting a position where the distance from a radio beacon or the like may be determined and for plotting Sumner lines.

These few uses of my invention will serve to show the adaptability of my invention in solving conventional chart problems and from experience, the navigator will discover for himself many other uses for my invention.

Some of the uses of my invention just described are conventional, but as certain other uses are novel, I have discussed some of them in order that the advantages of my invention may be fully appreciated.

Figure 5:
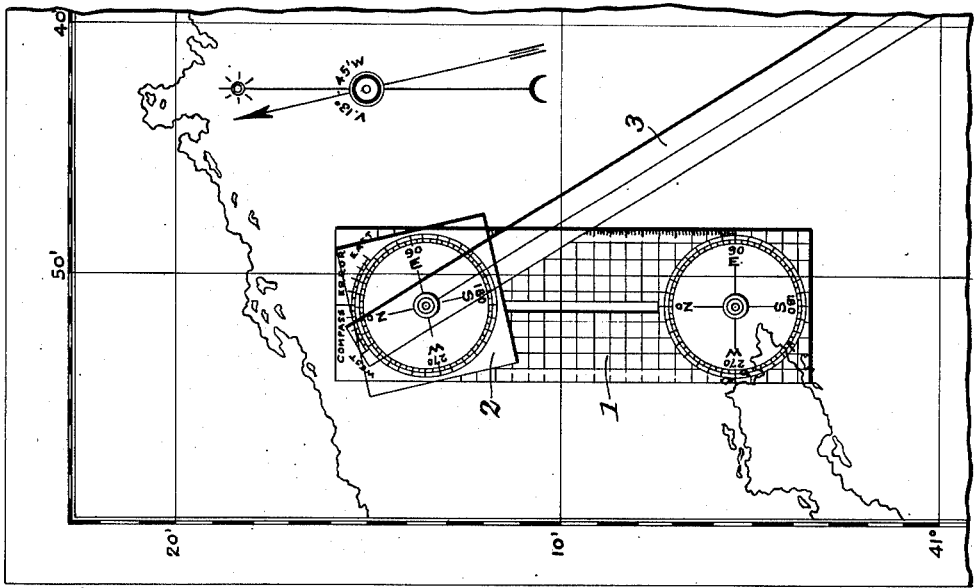
Fig. 5 shows a typical use of my invention in which compass error is allowed mechanically in either course or position plotting.

As a course protractor allowing mechanically for compass error, the movable protractor 2 with one arm 3 attached is itself slidably attached to the base 1 (see Fig. 5). When the movable protractor 2 is moved into an extreme position in the slot adjacent the compass error scale 4, the compass rose 12 and the compass error scale 4 are concentric and the center line of the movable protractor extends over the compass error scale. Because of this and the contrasted colors employed for each scale, very accurate readings and adjustments are possible.

With the movable protractor 2 in this position on the base 1, the base 1 is placed on the chart with the center of the movable protractor 2 defined by the hollow bolt 22 over the starting point of the particular course. Since the instrument is transparent, the chart can be readily observed through it and it should also be noted that the hollow bolt 22 permits a point to be observed, or to be made as it is of a size adapted to receive and center a pencil point. The base piece 1 is then positioned so that the lines 8 and 9 are parallel and perpendicular to meridians and parallels of latitude. With the base 1 oriented in this manner, the center line of the base 1 (the zero point on the compass error scale 4) is true north, south, east or west, and the corresponding point of the movable protractor 2 is used in conjunction therewith.

The movable protractor 2 is then rotated until the appropriate cardinal point is readable with the compass error scale 4. As stated on the particular chart being used, the movable protractor 2 is then corrected to magnetic north instead of true north.

With the movable protractor 2 held firmly in position, the arm 3 is swung until its center line is over the end of the particular course and the magnetic course is indicated on the movable protractor 2 by the center line of the arm 3.

If there is compass deviation, the deviation for the particular course is next determined and this is added to or subtracted from the magnetic variation by turning the movable protractor 2 relative to the base 1 so that the north point of the movable protractor now points the same as the north point of the steering compass card. With the protractor arm 3 over the end point of the course, the course to steer by the compass is given on the instrument.

As a cross bearing position plotter, that allows for course and compass error mechanically, the instrument is identical to that shown in Fig. 5 except that it includes the movable protractor 2 with two arms 3 attached thereto and itself attached to the base 1. The second arm 3 is omitted from Fig. 5 to simplify the drawings.

With such a device, compass bearings are taken on two objects in a conventional manner and the two arms are set to correspond to those bearings. The instrument is then set on the chart and the base piece 1 is oriented so that the zero marking of the compass error scale 4 coincides with a true cardinal point (north, south, east, west—whatever is most convenient). Compass error is then taken into consideration as above described and the arms 3 are adjusted as required by the compass bearings so that when the center lines of the arms 3 are over the center of the objects on which compass bearings were taken the center of the hollow bolt 22 of the movable protractor 2 is the true position of the ship. By this, both variations and deviation are taken into consideration and this is necessary since both of these factors may represent error unless corrected.

While the correction of compass error is an important advantage of my invention, my invention has other advantages that may not have been sufficiently emphasized in the discussion above. These advantages are inherent in the base and may be illustrated by considering the base piece 1 with a single arm 3 attached to the fixed protractor 5 as shown in Fig. 6.

With such an instrument, the actual position of the ship may be plotted from a radio beacon by taking a relative bearing to the beacon by a radio direction finder and by measuring the distance from the speed of sound of the synchronized fog horn. The arm 3 of the fixed protractor 5 is set to correspond to this relative bearing. After the distance has been determined by a speed of sound calculation, the instrument is placed on the chart so that a point on the center line of the arm 3 represents the distance from the radio beacon to the ship and so that the fore and aft lines 9 (longitudinal) of the base 1 are parallel to the course drawn on the chart. The ship's position is in the center of the hollow bolt 22.

Thus it will be noticed that the longitudinal lines 9 and transverse lines 10 on the base 1 are of real assistance in positioning the instrument. The importance of this will be obvious in this and other uses of my invention.

For example, the instrument just described may be used as a Sumner line plotter by which two points along a Sumner line may be plotted directly without drawing on the chart the azimuth line to the celestial object (see Fig. 6).

This may be effected after a sight has been taken on a celestial object and the azimuth and intercept to this celestial object has been calculated from a dead reckoned or assumed position. With the base 1 along the latitude scale of the plotting chart the distance thereon that represents the intercept may be noted. The arm 3 of the fixed protractor 5 is then set to correspond to the azimuth to the celestial object. The instrument is then placed on the chart with the center established by the hollow bolt 22 of the fixed protractor 5 over the assumed or dead reckoned position with the base 1 oriented to point true north. The arm 3 is then positioned so that its center line represents the azimuth line to the celestial object. With the arm 3 held in this position by means of pins through the hollow bolt 22 and the hole 20 in the arm 3, the base 1 is pivoted until the north, south or center line of the base 1 lines up exactly with the center line of the arm 3. Corresponding points on both scales 10 and 11 of the base 1 are marked, using the distance on the base line representing the intercept. A straight line between these two points gives the Sumner line. By securing another Sumner line based on another sight, the ship's position may be determined from the intersection of the thus easily established Sumner lines.

It will be noted that the base lines 9 and 10 and the movable protractor lines 14 and 15 are identical. This is important as, for example, when the instrument shown in Fig. 3 is used to plot positions by taking a relative bearing on an object and then sailing any convenient distance and then taking another bearing on the same object. The ship's position may be determined by utilizing both protractors 2 and 5 and setting the arm 3 to correspond to the bearings taken and adjusting the position of the movable protractor 2 to correspond to the distance sailed to establish an interconnection of the center line of the base 1 and an arm 3 through the hollow bolt 22 of the protractor representing the last taken bearing. Because the movable protractor may be adjusted to any desired distance sailed and because it may be turned, it is important that the north point of the movable protractor 2 head the same way as the north point of the fixed protractor 5, a result easily secured by having the lines of the movable protractor 2 in registry with the lines of the base 1.

Many other uses of my invention will occur to navigators and with the four arms with which my invention is properly equipped, unlimited flexibility in use is provided.

What I therefore claim and desire to secure by Letters Patent is:

1. A navigation instrument for chart work, said instrument comprising a base having a slot and graduations arcuately disposed to be concentric with one end of said slot establishing a compass error scale having a zero reading in alinement with said slot, a first protractor, an arm, hollow pivot means detachably connecting said first protractor and said arm, and permitting said first protractor to be slidably mounted on said base through said slot, said base having graduations adjacent the other end of said slot establishing a second protractor and an aperture in alinement with said slot defining the center of said second protractor, an arm, hollow pivot means detachably connecting said arm to said base through said aperture, said first protractor and said base having similar transverse and longitudinal graduations, and said first protractor being useable by itself in connection with said compass error scale when concentric therewith, and in connection with said second protractor at any position of said first protractor in said slot.

2. A navigation instrument for chart work, said instrument comprising a base having a slot and graduations arcuately disposed to be concentric with one end of said slot establishing a compass error scale having a zero reading in alinement with said slot, a first protractor, an arm, said base, said first protractor, and said arm being of transparent stock, hollow pivot means detachably connecting said first protractor and said arm and permitting said first protractor to be slidably mounted on said base through said slot, said base having graduations adjacent the other end of said slot establishing a second protractor and an aperture in alinement with said slot defining the center of said second protractor, an arm of transparent stock, hollow pivot means detachably connecting said arm to said base through said aperture, said first protractor and said base having similar transverse and longitudinal graduations, and said first protractor being usable by itself in connection with said compass error scale when concentric therewith, and in connection with said second protractor at any position of said first protractor in said slot.

3. A navigation instrument for chart work, said instrument comprising a base having a slot and graduations arcuately disposed to be concentric with one end of said slot establishing a compass error scale having a zero reading in alinement with said slot, a first protractor, an arm, hollow pivot means connecting said first protractor and said arm to said base through said slot, said base having graduations adjacent the other end of said slot establishing a second protractor and an aperture in alinement with said slot defining the center of said second protractor, an arm, hollow pivot means connecting said arm to said base through said aperture, said first protractor and said base having similar transverse and longitudinal graduations, and said first protractor being usable by itself in connection with said compass error scale when concentric therewith and in connection with said second protractor at any position of said first protractor in said slot.

4. A navigation instrument for chart work, said instrument comprising a base having a slot and graduations arcuately disposed to be concentric with one end of said slot establishing a compass error scale having a zero reading in alinement with said slot, a first protractor, an arm, said base, said first protractor, and said arm being of transparent stock, hollow pivot means connecting said first protractor and said arm to said base through said slot, said base having graduations adjacent the other end of said slot establishing a second protractor and an aperture in alinement with said slot defining the center of said second protractor, an arm of transparent stock, hollow pivot means connecting said arm to said base through said aperture, said first protractor and said base having similar transverse and longitudinal graduations, one of said longitudinal base lines being inclusive of said zero reading and constituting a center line.

5. A navigation instrument for chart work, said instrument comprising a base having a slot and graduations arcuately disposed to be concentric with one end of said slot establishing a compass error scale having a zero reading in alinement with said slot, a first protractor, an arm, said base, said first protractor, and said arm being of transparent stock, hollow pivot means connecting said first protractor and said arm to said base through said slot, said base having graduations adjacent the other end of said slot establishing a second protractor and an aperture in alinement with said slot defining the center of said second protractor, an arm of transparent stock, hollow pivot means connecting said arm to said base through said aperture, said first protractor and said base having similar transverse and longitudinal graduations, one of said longitudinal base graduations being inclusive of said zero reading and constituting a center line, and said base having marginal graduations inclusive of said transverse graduations and establishing a base line of a desired number of units between the center of said second protractor and the opposite end of said slot.

6. A navigation instrument for chart work, said instrument comprising a base having a slot and graduations arcuately disposed to be concentric with one end of said slot establishing a compass error scale having a zero reading in alinement with said slot, a first protractor, an arm, said base, said first protractor and said arm being of transparent stock, hollow pivot means connecting said first protractor and said arm to said base through said slot, said base having graduations adjacent the other end of said slot establishing a second protractor and an aperture in alinement with said slot defining the center of said second protractor, an arm of transparent stock, hollow pivot means connecting said arm to said base through said aperture, said first protractor and said base having similar transverse and longitudinal graduations, one of said longitudinal base lines being inclusive of said zero reading and constituting a center line and said base having marginal graduations inclusive of said transverse lines establishing a pair of base lines between the center of said second protractor and the opposite end of said slot, one of said base lines representing twice the number of units represented by the other of said base lines.

7. A navigation instrument for chart work, said instrument comprising a base having a slot and graduations arcuately disposed to be concentric with one end of said slot establishing a compass error scale having a zero reading in alinement with said slot, a first protractor, an arm, said base, said first protractor and said arm being of transparent stock, hollow pivot means connecting said first protractor and said arm to said base through said slot, said base having graduations adjacent the other end of said slot establishing a second protractor and an aperture in alinement with said slot defining the center of said second protractor, an arm of transparent stock, hollow pivot means connecting said arm to said base through said aperture, said first protractor and said base having similar transverse and longitudinal graduations, one of said longitudinal base lines being inclusive of said zero reading and constituting a center line and said base having marginal graduations inclusive of said transverse lines and each of said base lines being subdivided with the subdivisions of each base line being transversely alined.

8. The device of claim 1 in which the hollow pivot means comprises a hollow bolt, a nut, and a washer member including a lug portion to facilitate manual rotation of said member to rotate said nut therewith.

9. The device of claim 1 in which the hollow pivot means comprises a hollow bolt, a nut, and a washer member including a lug portion, to facilitate manual rotation of said member to rotate said nut therewith, and said hollow bolt being of a length sufficient to permit at least three arms to be assembled on either of said protractors.

10. A navigation instrument for chart work, said instrument comprising an elongated base of transparent stock having transverse and longitudinal graduations to aid in the orientation of said base on said chart, one of said longitudinal lines comprising the center line of said instrument, said base having marginal graduations inclusive of said transverse graduations establishing scales having transversely alined zero readings, and a protractor, said protractor including an arm, said arm being of substantially greater length than said base, and hollow means pivotally attaching said arm to said base in alinement with the zero readings of said marginal scales, said arm being of transparent stock and having a center line and having graduations identical with said scales on said base.

11. A navigation instrument for chart work, said instrument comprising an elongated base of transparent stock having transverse and longitudinal graduations to aid in the orientation of said base on said chart, one of said longitudinal lines comprising the center line of said instrument, said base having marginal graduations of different scales, inclusive of said transverse graduations, and a protractor, said protractor including an arm, said arm being of substantially greater length than said base and hollow means pivotally attaching said arm to said base, said arm being of transparent stock and having a center line, an aperture through said center line adjacent the free end of said arm, and graduations identical with said scales on said base.

12. A base for use in establishing navigation instruments, said base comprising a sheet of transparent stock having a slot to slidably receive a protractor, longitudinal and transverse lines on said base to facilitate in the orientation of said base on a chart, one of said longitudinal lines comprising the center line of said base, arcuate graduations on said base concentric with one end of said slot and establishing a compass error scale having a zero reading on said center line, graduations on said base adjacent the other end of said slot establishing a protractor, an aperture through the center line of said base defining the center of said protractor to receive a protractor arm, marginal scales inclusive of said transverse lines, said marginal scales establishing base lines of a desired number of units intermediate the center of said base protractor and the opposite end of said slot.

13. A navigation instrument for chart work, said instrument comprising an elongated base member, the long sides of said member presenting parallel straight edges, marginal transversely alined graduations establishing scales having transversely alined zero readings, a protractor, an arm member, hollow pivot means pivotally attaching said arm member to said base member through the center of said protractor and in alinement with said zero readings, said arm being substantially longer than said base, and means on one of said members to facilitate the positioning of said arm member in parallel with the long sides of said base member.

EGERTON B. SAWTELLE.